United States Patent
Dhanapal et al.

(10) Patent No.: US 11,490,447 B2
(45) Date of Patent: Nov. 1, 2022

(54) INTELLIGENT 5G NR RRC STATE TRANSITIONS

(71) Applicant: APPLE INC., Cupertino, CA (US)

(72) Inventors: Muthukumaran Dhanapal, Cupertino, CA (US); Li Su, San Diego, CA (US); Vijay Venkataraman, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/234,453

(22) Filed: Apr. 19, 2021

(65) Prior Publication Data

US 2021/0337621 A1 Oct. 28, 2021

Related U.S. Application Data

(60) Provisional application No. 63/016,498, filed on Apr. 28, 2020.

(51) Int. Cl.
| | |
|---|---|
| *H04W 76/27* | (2018.01) |
| *H04W 24/08* | (2009.01) |
| *H04W 76/28* | (2018.01) |
| *H04W 68/00* | (2009.01) |

(52) U.S. Cl.
CPC .......... *H04W 76/27* (2018.02); *H04W 24/08* (2013.01); *H04W 68/005* (2013.01); *H04W 76/28* (2018.02)

(58) Field of Classification Search
None
See application file for complete search history.

(56) References Cited

U.S. PATENT DOCUMENTS

| | | | | |
|---|---|---|---|---|
| 2013/0215834 | A1* | 8/2013 | Deivasigamani | H04W 76/27 370/329 |
| 2014/0334389 | A1* | 11/2014 | Abdel-Samad | H04W 74/004 370/328 |
| 2018/0220487 | A1* | 8/2018 | Wu | H04W 76/27 |
| 2019/0254107 | A1* | 8/2019 | Stattin | H04W 76/34 |
| 2020/0084746 | A1* | 3/2020 | Rune | H04W 68/02 |
| 2020/0100312 | A1* | 3/2020 | Hapsari | H04W 76/27 |
| 2021/0076308 | A1* | 3/2021 | Kim | H04W 76/16 |
| 2021/0314860 | A1* | 10/2021 | Chen | H04W 48/18 |

OTHER PUBLICATIONS

Huawei, "Scenarios and Solution for State Mismatch", R2-1704883, dated May 2017. (Year: 2017).*
NTT DoCoMo "Discussion on RRC State Mismatch Issue" R2-167140 Dated Oct. 2016 (Year: 2016).*
Huawei, "Scenarios and Solution for State Mismatch", R2-1704883 (Year: 2017).*

* cited by examiner

*Primary Examiner* — Jamaal Henson

(57) ABSTRACT

A UE in an RRC inactive state may determine an operational state mismatch between an actual RRC operational state for the UE and a stored RRC operational state for the UE maintained at a network node. To determine the mismatch, while the UE is in the RRC inactive state, the UE may monitor at least one of paging messages, serving cell power levels, or neighbor cell power levels. When an operational state mismatch is detected, the UE may initiate a state correction procedure rather than an RRC resume procedure.

15 Claims, 9 Drawing Sheets

INTELLIGENT 5G NR RRC STATE TRANSITIONS

TECHNICAL FIELD

This application relates generally to wireless communication systems, and more specifically to handling radio resource control (RRC) state transitions in new radio including an RRC inactive state.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) includes sub-6 GHz frequency bands, some of which are bands that may be used by previous standards, but may potentially be extended to cover potential new spectrum offerings from 410 MHz to 7125 MHz. Frequency Range 2 (FR2) includes frequency bands from 24.25 GHz to 52.6 GHz. Bands in the millimeter wave (mmWave) range of FR2 have shorter range but higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
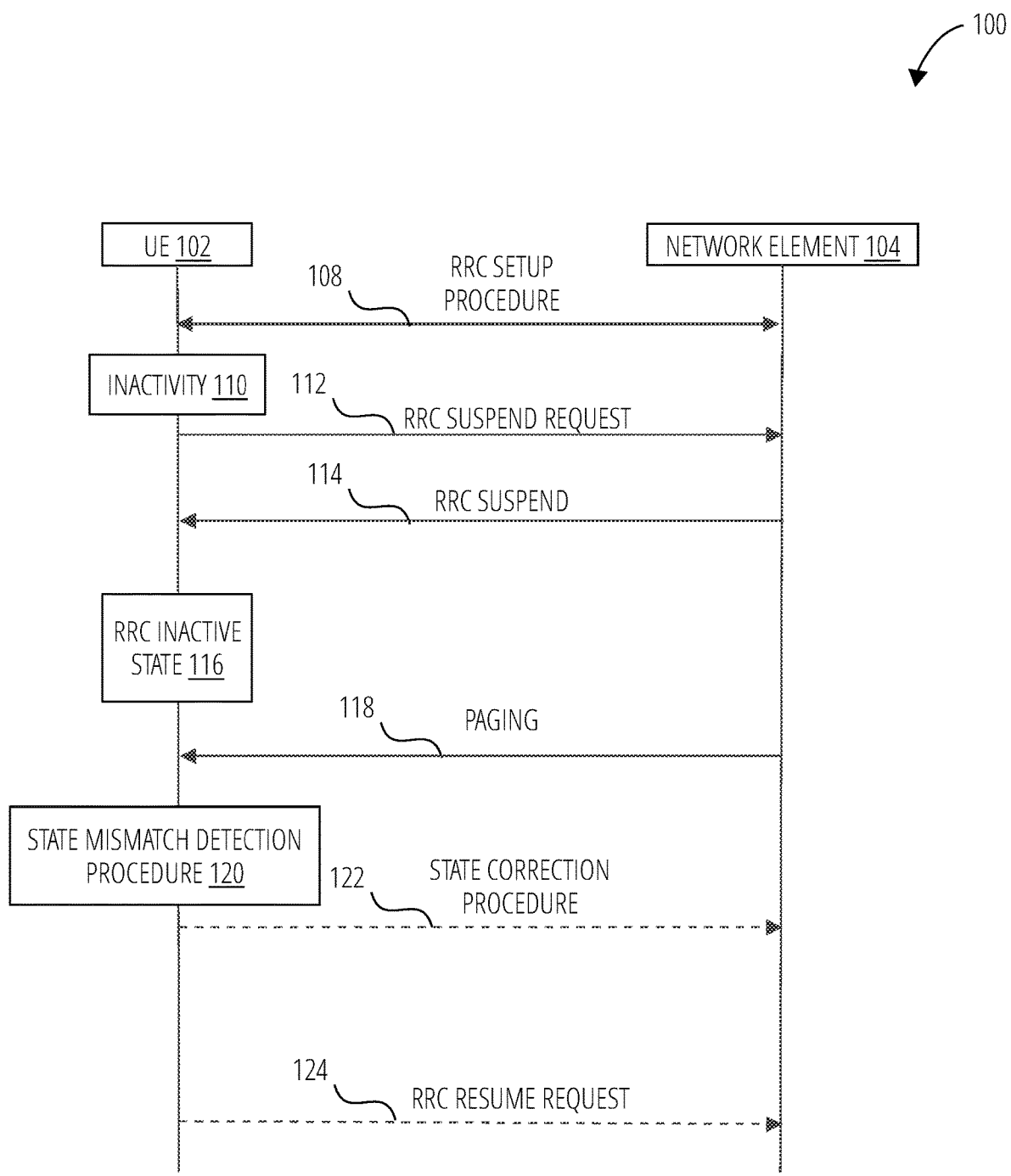
FIG. 1 illustrates a signal flow diagram for a UE centric approach to detect and handle an RRC mismatch condition in accordance with one embodiment.

Radio Resource Control (RRC) states are used by network communication protocols as a way to manage operations between a network and a user equipment (UE). To maintain synchronous operations between the UE and the network, the network maintains UE context. Additionally, the network may track a current RRC state for the UE. As the UE moves from one RRC state to another, the UE RRC state at the network is updated to facilitate the communications and operations associated with the current RRC state. Previously RRC states included RRC connected and RRC inactive. The fifth generation (5G) new radio (NR) has introduced an additional state, RRC inactive, to further optimize network and UE interactions.

Data can be transferred between the UE and network, when the UE is in the RRC connected state. The network often tracks the state of the UE to ensure that the UE can receive transmitted data. One way for the network to track the state of the UE is to have a corresponding state represented in the network. Therefore, when both the UE and the network show the RRC connected state, the network can transfer data. If the operational state of the UE goes out of sync with the representative state in the network, then data transfer is stalled and the UE can become unresponsive.

Additionally, in 5G NR, UE transitions to an RRC inactive state from an RRC connected state as part of an RRC suspend procedure. The UE then can resume the same RRC Connection via an RRC Resume procedure. For the resume procedure to occur, the network should have the UE context saved. UE context can include the security context, measurement config, info about the bearers, etc. Thus, for the RRC inactive state to be effectively implemented, the network must track the UE context and the RRC state of the UE.

However, the network may forget the UE context or become out of sync with the RRC state for a few reasons. For example, a network node such as a gNodeB (gNB) may reach a limit for number of unique UE contexts. Unlike RRC connected state, which is short lived, RRC inactive state duration is expected to be for long durations. The long duration of the RRC inactive state means that the gNB is expected to maintain each individual UE context for a long duration. Because the gNB is maintaining each of the UE contexts for the duration of the RRC inactive state, the gNB will likely accumulate a large amount of UE contexts. Thus, there is very high likelihood that the gNB hits a maximum UE context limit supported by the gNB database. Reaching this limit will cause the gNB to evict existing contexts from the database, to make way for the new ones.

Additionally, a gNB may crash causing all the UE contexts to be lost. While the gNB crashing may be rare it is still possible and a UE context recovery procedure should be considered.

The network dropping the UE context could lead to un-necessary battery drain for the UE. For example, the UE will waste battery initiating an RRC resume procedure that will fail if the UE context at the network side is lost. After the RRC resume procedure fails the UE will establish a new RRC connection. Thus, the UE will perform an extra RACH procedure when doing both attempting the resume procedure and establishing a new RRC.

Additionally, in some scenarios a dual subscriber identity module (SIM) device may miss a connection release message due to a radio frequency tune away. Missing the connection release message may cause an RRC state mismatch where the UE continues to be in RRC inactive state while the network transitions the RRC state to an RRC Idle state.

Embodiments herein describe systems, apparatuses, and methods for a UE centric approach to determine inconsistencies at the network side where the network has lost the UE context or RRC state and initiate a state correction procedure instead of simply resuming the existing RRC connection.

Various operations will be described as multiple discrete operations, in turn, in a manner that is most helpful in understanding the disclosure. The order of the description, however, should not be construed to imply that these operations are necessarily order dependent. In particular, these operations need not be performed in the order of presentation.

Additional details and examples are provided with reference to the figures below. The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments.

FIG. 1 is a simplified signal flow diagram 100 of an example procedure for a UE centric approach to determine and correct inconsistencies at the network side where the network has lost UE context or an RRC state and initiate a state correction procedure instead of resuming an existing RRC connection. A UE 102 and a network node 104 (e.g., gNB) transmit and receive messages to perform an RRC setup procedure 108. After the RRC setup procedure 108 is complete, the UE 102 is in an RRC connected state.

After the UE detects a period of inactivity 110, the UE may transmit an RRC suspend request 112 to the network node 104. When the network node 104 receives the RRC suspend request 112, the network node 104 may transmit an RRC suspend 114 message to the UE 102. The UE 102 transitions to an RRC inactive state 116 from the RRC connected state as part of the RRC suspend procedure. While the UE is in the RRC inactive state 116, the network node 104 will transmit paging 118 messages for the UE 102 to receive according to the operations of the RRC inactive state 116.

While in the RRC inactive state 116, the UE 102 may perform a state mismatch detection procedure 120. The state mismatch detection procedure 120 determines an RRC operating state mismatch condition between the UE 102 and the network node 104. The RRC mismatch condition occurs when there are inconsistencies with between the UE 102 and the network node 104. The RRC operating state mismatch condition may include that the actual RRC operational state for the UE 102 and a stored RRC operational state for the UE maintained at the network node 104 are out of sync. For example, the UE 102 may be in an RRC inactive state 116 and the RRC operational state for the UE maintained at a network node may be an RRC idle state or an RRC connected state. Additionally, the RRC operating state mismatch may include the gNB losing UE context for UE 102.

The state mismatch detection procedure 120 may determine the RRC operating state mismatch condition by monitoring at least one of paging 118 messages, serving cell power levels, or neighbor cell power levels. Monitoring paging 118 messages may include detecting paging cycle properties (e.g., timing, number of pages). In some embodiments, monitoring paging 118 messages may include determining paging content or type. In some embodiments, the UE 102 may monitor both paging cycle properties and paging content or type.

Based on whether the UE 102 detects a state mismatch, the UE 102 may either initiate a state correction procedure 122 or initiate an RRC resume request 124 to enter back into an RRC connected state with the network node 104. If there is no state mismatch detected, the UE 102 may initiate an RRC resume procedure with an RRC resume request 124.

When the UE 102 detects an RRC operating state mismatch condition, the UE 102 may use a state correction procedure 122 instead of resuming the existing connection. The operations that the UE 102 performs for the state correction procedure 122 may be based on what indications of the RRC operating state mismatch condition where detected by the state mismatch detection procedure 120. For example, a paging message mismatch may result in a first set of operations for the state correction procedure 122, while a drop in power levels may result in a second set of operations for the state correction procedure 122. The state correction procedure 122 may include the UE 102 initiating an RRC connection establishment procedure, initiating a new non-access stratum (NAS) registration procedure, and/or attempting to camp on a cell which belongs to a different radio access network (RAN) notification area (RNA).

FIGS. 2-5 provide more details on concerning methods that the UE 102 may implement to determine a state mismatch condition and initiate a state correction procedure 122.

Figure 2:
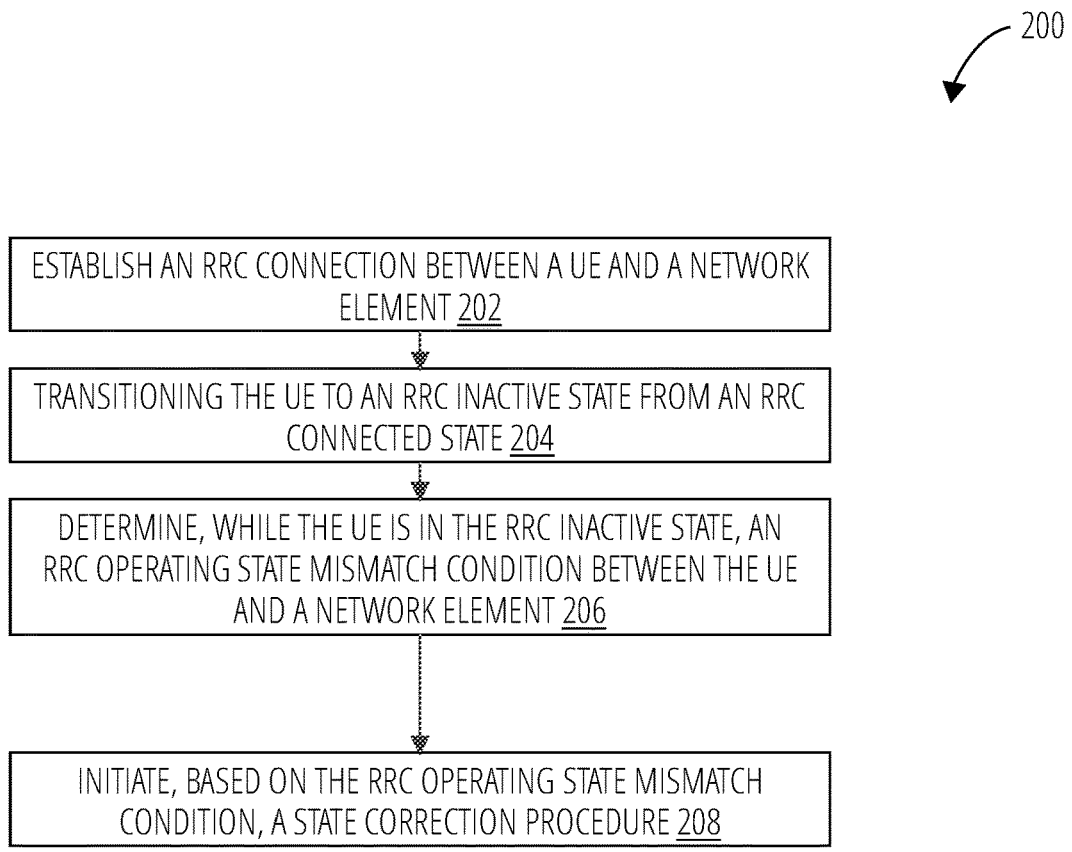
FIG. 2 is a flowchart of a method for a UE to determine and handle a state mismatch condition in accordance with one embodiment.

FIG. 2 is a flowchart of a method 200 for a UE to determine and handle a state mismatch condition. A UE may establish 202 an RRC connection between a UE and a network node. The UE at this stage may be in an RRC connected state. The UE transitions 204 to an RRC inactive state from the RRC connected state after a period of inactivity. When the UE changes states, the network node updates a stored RRC operational state for the UE maintained at the network node and stores a UE context for the UE. However, as discussed previously, the UE context may be dropped and the stored RRC operational state may become mismatched with the actual RRC operation state of the UE.

Therefore, the UE determines 206, while in the RRC inactive state, an RRC operating state mismatch condition between the UE and the network node. Determining the RRC operating state mismatch condition comprises monitoring at least one of paging messages, paging timing/cycle, serving cell power levels, or neighbor cell power levels. The UE determines 206 the RRC operating state mismatch condition when one or more of these monitored parameters does not correlate with the RRC inactive state. For example, a drastic drop in power levels of the serving cell or neighbor cell would be an indication to the UE that the UE was dropped from the network node (e.g., gNB). Whereas, a paging message or paging cycle that relates to an RRC state other than RRC inactive state (e.g., RRC idle and RRC connected) would be an indication for the UE that the RRC operational state for the UE maintained at the network node was mismatched with the current RRC inactive state of the UE. The UE initiates 208 a state correction procedure based on a determination that there is an RRC state mismatch condition. In some embodiments, operations of the state correction procedure are based on the paging messages, the serving cell power levels, and the neighbor cell power levels.

Figure 3:
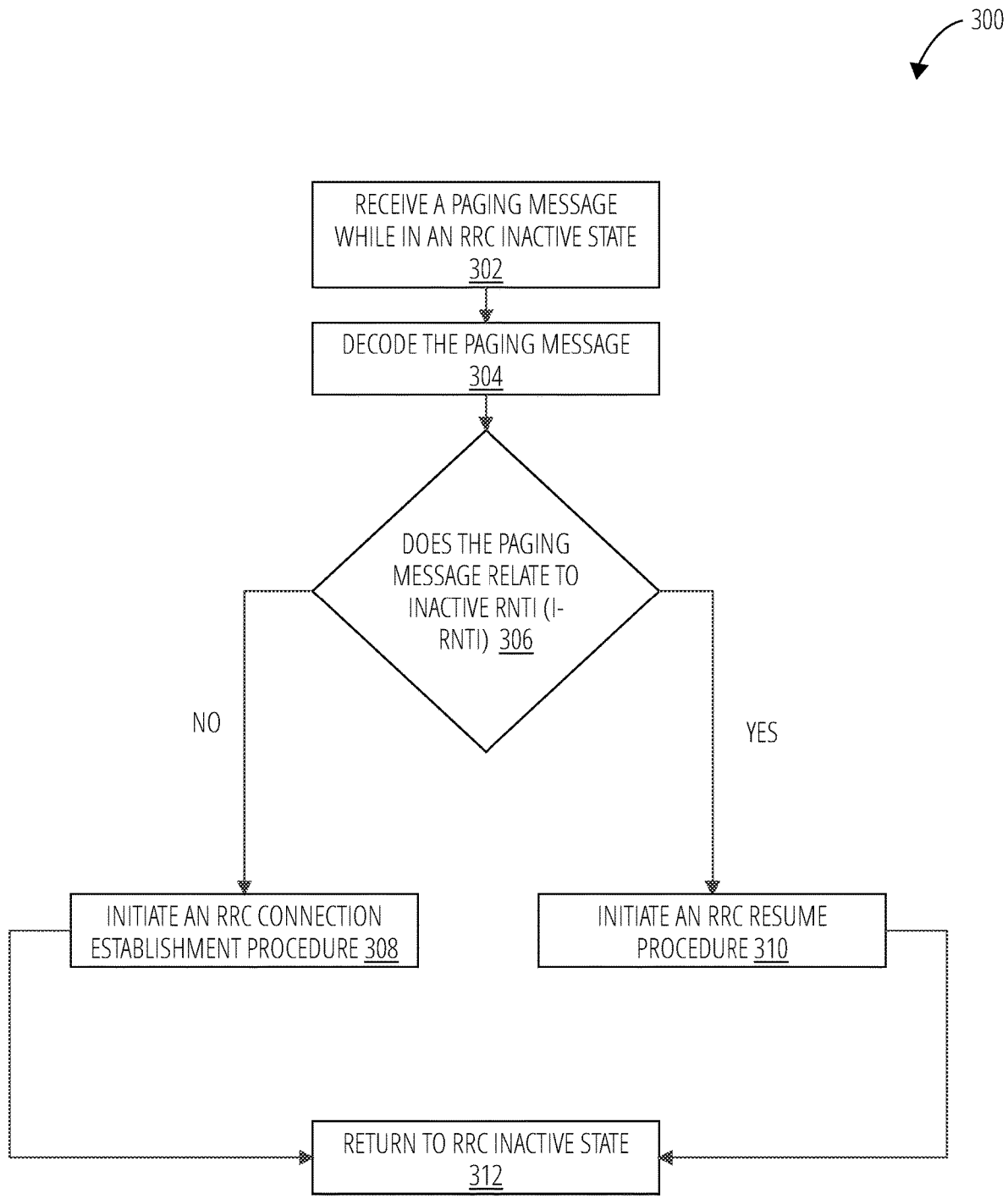
FIG. 3 is a flowchart of a method for a UE to determine and handle an RRC state mismatch condition using paging messages while in an RRC inactive state in accordance with one embodiment.
Figure 4:
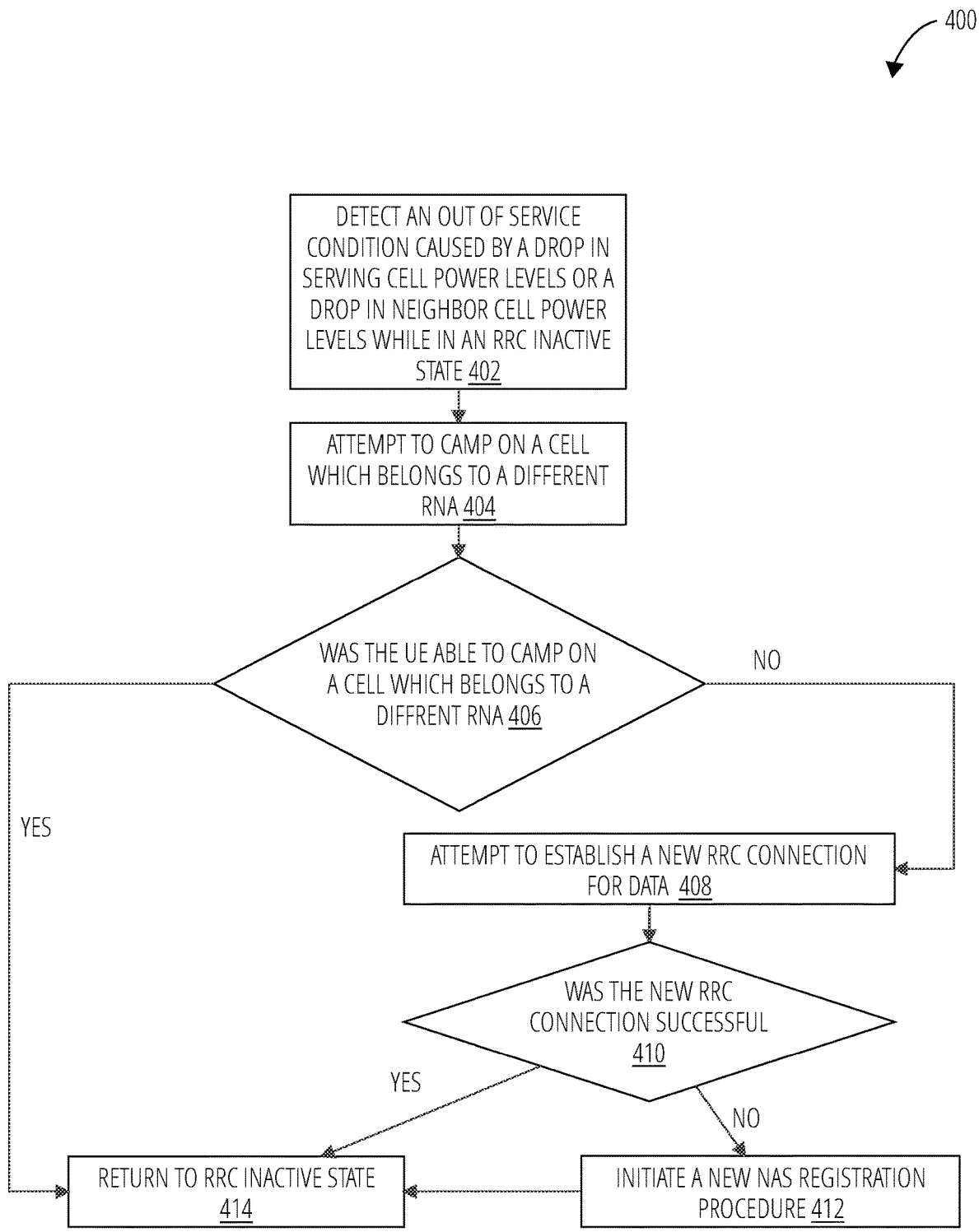
FIG. 4 is a flowchart of a method for a UE to determine and handle an RRC state mismatch condition using an out of service condition while in an RRC inactive state in accordance with one embodiment.
Figure 5:
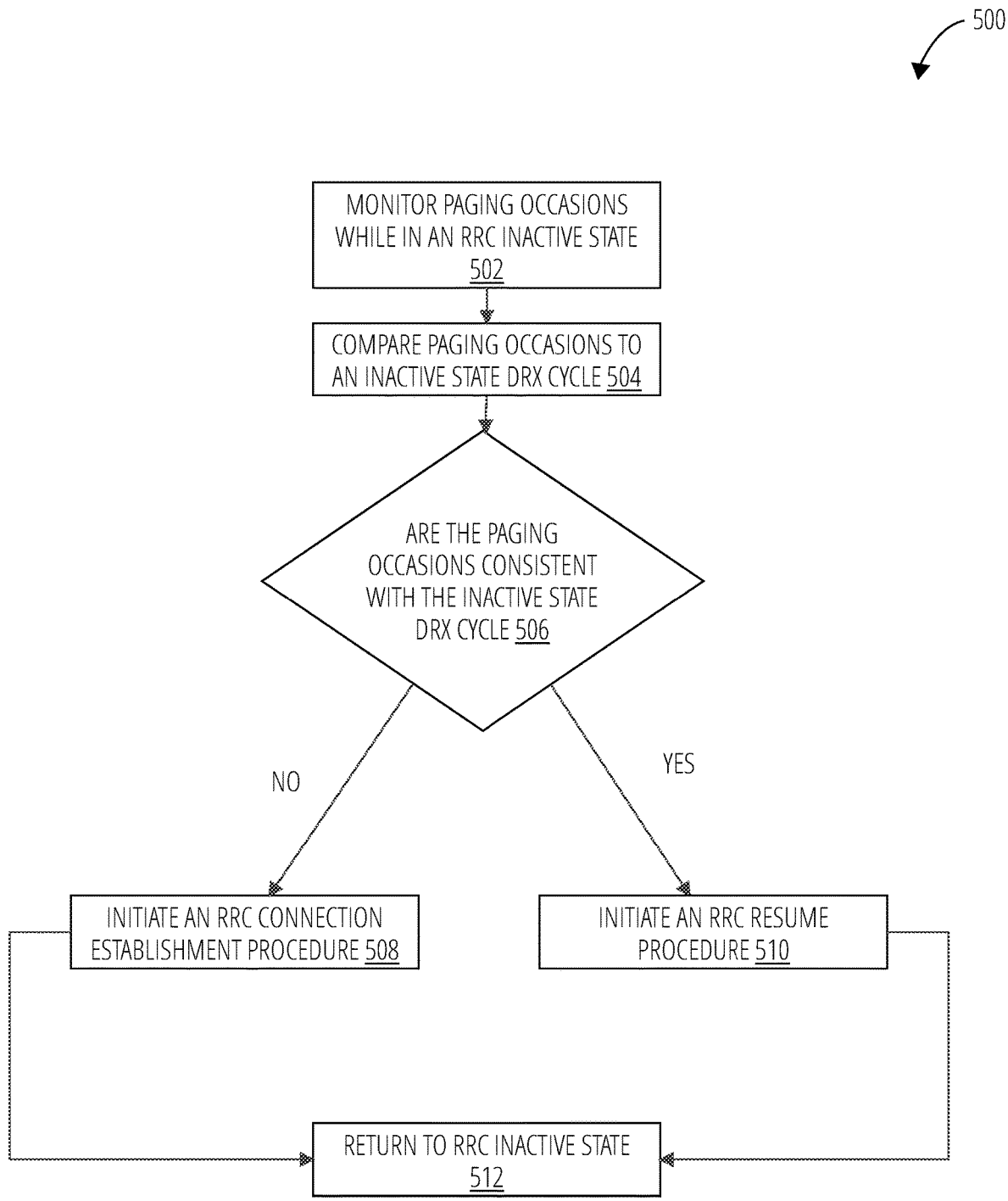
FIG. 5 is a flowchart of a method for a UE to determine and handle an RRC state mismatch condition using a paging cycle while in an RRC inactive state in accordance with one embodiment.

FIGS. 3-5 illustrate three different ways that the UE may use to determine 206 the RRC operating state mismatch condition while in an RRC inactive state and to initiate 208 a state correction procedure. The UE may use one or more of the methods for determining and correcting an RRC mismatch condition. For example, in some embodiments the UE uses only the method outlined in FIG. 3, in other embodiments the UE uses only the method outlined in FIG. 4, and in other embodiments the UE uses only the method outlined in FIG. 5. In some embodiments, the UE may use a sub-combination of the methods outlined in FIGS. 3-5 for example the UE may use the methods outlined in FIG. 3 and FIG. 4, or the UE may use the methods outlined in FIG. 4 and FIG. 5, or the UE may use the methods outlined in FIG. 3 and FIG. 5. In some embodiments the UE may use all of the methods outlined in FIGS. 3-5

FIG. 3 is a flowchart of a method 300 for a UE to determine and handle an RRC state mismatch condition using paging messages while in an RRC inactive state. The UE receives 302 a paging message while in an RRC inactive state. The UE decodes 304 the received paging message and determines 306 if the paging message is related to Inactive Radio Network Temporary Identifier (I-RNTI).

If the received paging message is related to I-RNTI, the UE determines that an RRC state mismatch condition has not occurred. Therefore, the UE may simply initiate 310 an RRC resume procedure, and transition to an RRC connected state. After a period of inactivity, the UE returns 312 to an RRC inactive state. Once in the RRC inactive state, the UE may monitor again for an RRC state mismatch.

If the received paging message is not related to I-RNTI, the UE determines that an RRC state mismatch condition has occurred. When a UE determines an RRC state mismatch condition based on the paging message, the RRC state correction procedure may comprise an RRC connection establishment procedure. The UE initiates 308 an RRC connection establishment procedure instead of an RRC resume procedure. For example, the RRC connection establishment procedure may honor a mobile termination (MT) page when the gNB has lost the UE context and the MT page is coming from the core network. In other words, in some embodiments, the UE uses core network paging to determine that a RAN has lost UE context and accordingly that the gNB is not in Inactive state. After a new RRC connection is established, after a period of inactivity the UE returns 312 to an RRC inactive state. Once in the RRC inactive state, the UE may monitor again for an RRC state mismatch.

FIG. 4 is a flowchart of a method 400 for a UE to determine and handle an RRC state mismatch condition using an out of service condition while in an RRC inactive state. If the UE detects 402 an out of service condition caused by drop in serving cell power levels or neighbor cell power levels below a threshold level, the UE determines that the RRC operating state mismatch condition has occurred. For example, the UE may detect a drop in serving cell power levels to a drastically lower level. As another example, the UE may detect a drop in neighbor cell power levels to a drastically lower level where the neighbor cell belongs to the same RAN notification area/network as the serving cell.

Once the RRC state mismatch condition is detected based on the out of service condition caused by the reasons outlined above, the state correction procedure may comprise the remaining steps in the method 300. The UE attempts 404 to camp on a cell which belongs to a different RNA, as compared to the original cell with which the UE had an RRC connection. If the UE is able to camp on such a cell, The UE will trigger an RNA update procedure. Accordingly, if the UE is able 406 to camp on the cell belonging to a different RNA, the UE may enter a UE connected state and after a period of inactivity returns 414. Once in the RRC inactive state, the UE may monitor again for an RRC state mismatch.

If the is not able 406 to camp on the cell belonging to a different RNA, the UE may perform additional operations. For example, if the UE does not find a cell in a different RNA and ends up camping on the same cell or a different cell but in the same RNA as the cell which deteriorated while the UE was in RRC inactive state then the UE will perform steps 408-412 such that the UE can returns 414 to an RRC inactive state without an RRC state mismatch condition. Steps 408-412 may ensure that UE is reachable to the network for MT calls which might get hampered due to state mismatch between the UE and the network. The UE will attempt 408 to establish a new RRC connection for data (may simply be dummy data) and determine if the network remembers the UE context. The UE determines 410 if the new RRC connection was successful. If network rejects the connection of the UE, then UE initiates 412 a new NAS registration procedure to enter an RRC connected state and after a period of inactivity returns 414. If the RRC connection for dummy data is received correctly by the network then UE is in an RRC connected state and returns 414 to an RRC inactive state after a period of inactivity. Once in the RRC inactive state, the UE may monitor again for an RRC state mismatch.

FIG. 5 is a flowchart of a method 500 for a UE to determine and handle an RRC state mismatch condition using a paging cycle while in an RRC inactive state. This method 500 may be used for delay tolerant devices. The UE monitors 502 paging occasions while in an RRC inactive state. The UE compares 504 the paging occasions to an inactive state DRC cycle.

The UE determines 506 whether the paging occasions are consistent with the inactive state Discontinuous Reception (DRX) cycle. To determine that the DRX cycle corresponds to the idle mode DRX rather than the inactive state DRX, the UE may monitor the repetition of same page being repeated multiple times. Based on the timing and repetition the UE will determine that the DRX cycle corresponds to an idle mode DRX or an inactive state DRX. If UE detects that the network is paging the UE in a DRX cycle corresponding to an Idle mode DRX rather than the Inactive state DRX, then the UE initiates 508 an RRC Connection establishment procedure instead of RRC connection resume procedure to honor the MT page. Otherwise, the UE initiates 510 an RRC resume procedure. The UE returns 512 to an RRC inactive state after a period of inactivity. Once in the RRC inactive state, the UE may monitor again for an RRC state mismatch.

Figure 6:
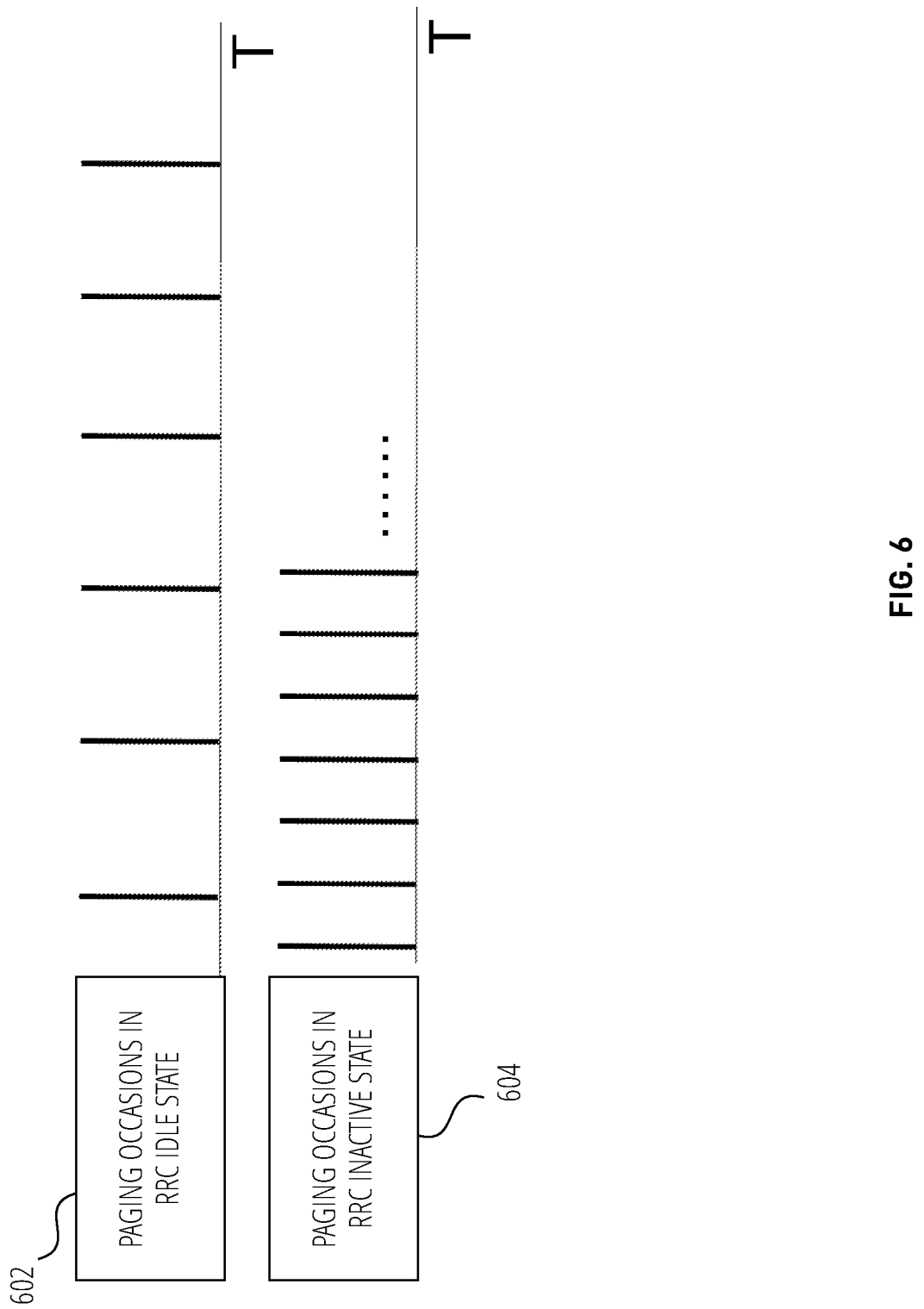
FIG. 6 illustrates paging occasions corresponding to different RRC states in accordance with one embodiment.

FIG. 6 illustrates paging occasions corresponding to different RRC states. Paging occasions 602 corresponding to an RRC idle state are more spread out along a time line than paging occasions 604 corresponding to an RRC inactive state. This difference in paging occasion timing may be used by a UE to determine an RRC state mismatch condition as explained with reference to FIG. 5.

Example System Architecture

In certain embodiments, 5G System architecture supports data connectivity and services enabling deployments to use techniques such as Network Function Virtualization and Software Defined Networking. The 5G System architecture may leverage service-based interactions between Control Plane Network Functions. Separating User Plane functions from the Control Plane functions allows independent scalability, evolution, and flexible deployments (e.g., centralized location or distributed (remote) location). Modularized function design allows for function re-use and may enable flexible and efficient network slicing. A Network Function and its Network Function Services may interact with another NF and its Network Function Services directly or indirectly via a Service Communication Proxy. Another intermediate function may help route Control Plane messages. The architecture minimizes dependencies between the AN and the CN. The architecture may include a converged core network with a common AN-CN interface that integrates different Access Types (e.g., 3GPP access and non-3GPP access). The architecture may also support a unified authentication framework, stateless NFs where the compute resource is decoupled from the storage resource, capability exposure, concurrent access to local and centralized services (to support low latency services and access to local data networks, User Plane functions can be deployed close to the AN), and/or roaming with both Home routed traffic as well as Local breakout traffic in the visited PLMN.

The 5G architecture may be defined as service-based and the interaction between network functions may include a service-based representation, where network functions (e.g., AMF) within the Control Plane enable other authorized network functions to access their services. The service-based representation may also include point-to-point reference points. A reference point representation may also be used to show the interactions between the NF services in the network functions described by point-to-point reference point (e.g., N11) between any two network functions (e.g., AMF and SMF).

Figure 7:
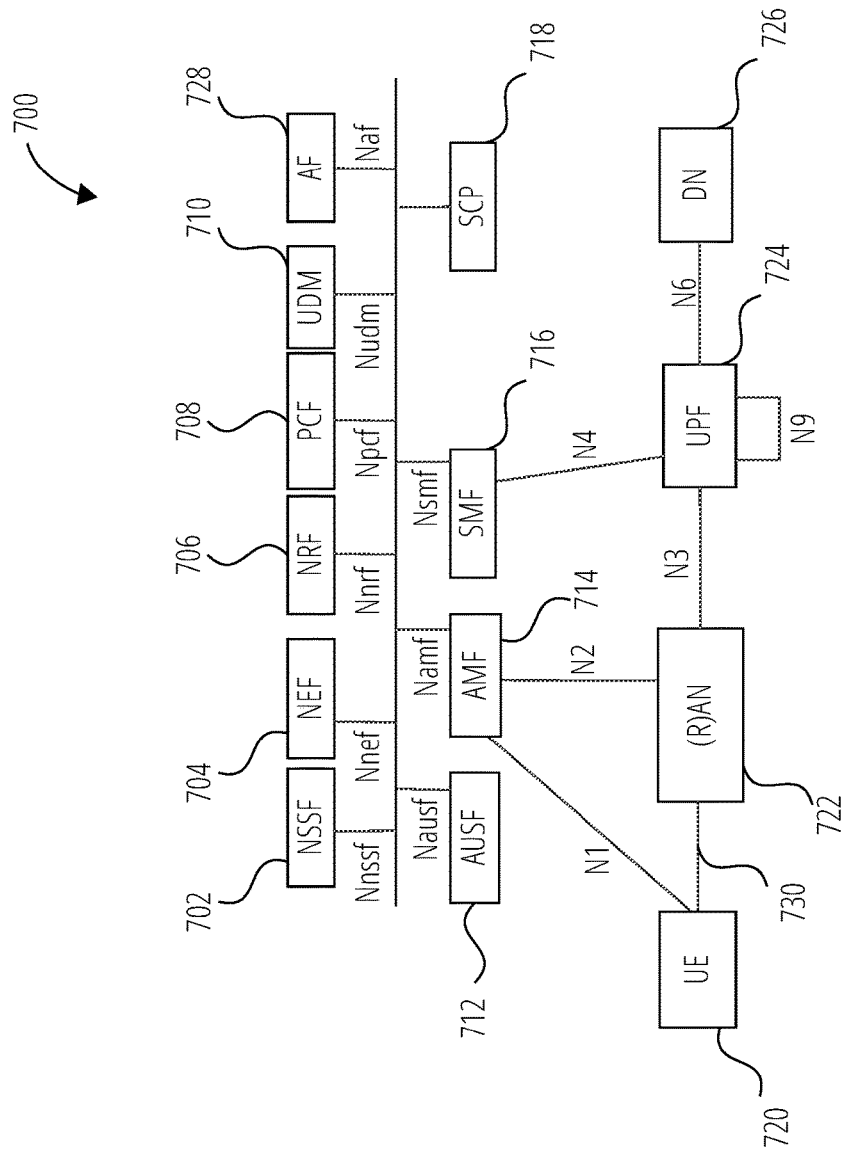
FIG. 7 illustrates an example service based architecture in accordance with certain embodiments.

FIG. 7 illustrates a service based architecture 700 in 5GS according to one embodiment. As described in 3GPP TS 23.501, the service based architecture 700 comprises NFs such as an NSSF 702, a NEF 704, an NRF 706, a PCF 708, a UDM 710, an AUSF 712, an AMF 714, an SMF 716, for communication with a UE 720, a (R)AN 722, a UPF 724, and a DN 726. The NFs and NF services can communicate directly, referred to as Direct Communication, or indirectly via a SCP 718, referred to as Indirect Communication. FIG. 7 also shows corresponding service-based interfaces including Nutm, Naf, Nudm, Npcf, Nsmf, Nnrf, Namf, Nnef, Nnssf, and Nausf, as well as reference points N1, N2, N3, N4, and N6. A few example functions provided by the NFs shown in FIG. 7 are described below.

The NSSF 702 supports functionality such as: selecting the set of Network Slice instances serving the UE; determining the Allowed NSSAI and, if needed, mapping to the Subscribed S-NSSAIs; determining the Configured NSSAI and, if needed, the mapping to the Subscribed S-NSSAIs; and/or determining the AMF Set to be used to serve the UE, or, based on configuration, a list of candidate AMF(s), possibly by querying the NRF.

The NEF 704 supports exposure of capabilities and events. NF capabilities and events may be securely exposed by the NEF 704 (e.g., for 3rd party, Application Functions, and/or Edge Computing). The NEF 704 may store/retrieve information as structured data using a standardized interface (Nudr) to a UDR. The NEF 704 may also secure provision of information from an external application to 3GPP network and may provide for the Application Functions to securely provide information to the 3GPP network (e.g., expected UE behavior, 5GLAN group information, and service specific information), wherein the NEF 704 may authenticate and authorize and assist in throttling the Application Functions. The NEF 704 may provide translation of internal-external information by translating between information exchanged with the AF and information exchanged with the internal network function. For example, the NEF 704 translates between an AF-Service-Identifier and internal 5G Core information such as DNN and S-NSSAI. The NEF 704 may handle masking of network and user sensitive information to external AF's according to the network policy. The NEF 704 may receive information from other network functions (based on exposed capabilities of other network functions), and stores the received information as structured data using a standardized interface to a UDR. The stored information can be accessed and re-exposed by the NEF 704 to other network functions and Application Functions, and used for other purposes such as analytics. For external exposure of services related to specific UE(s), the NEF 704 may reside in the HPLMN. Depending on operator agreements, the NEF 704 in the HPLMN may have interface (s) with NF(s) in the VPLMN. When a UE is capable of switching between EPC and 5GC, an SCEF+NEF may be used for service exposure.

The NRF 706 supports service discovery function by receiving an NF Discovery Request from an NF instance or SCP and providing the information of the discovered NF instances to the NF instance or SCP. The NRF 706 may also support P-CSCF discovery (specialized case of AF discovery by SMF), maintains the NF profile of available NF instances and their supported services, and/or notify about newly registered/updated/deregistered NF instances along with its NF services to the subscribed NF service consumer or SCP. In the context of Network Slicing, based on network implementation, multiple NRFs can be deployed at different levels such as a PLMN level (the NRF is configured with information for the whole PLMN), a shared-slice level (the NRF is configured with information belonging to a set of Network Slices), and/or a slice-specific level (the NRF is configured with information belonging to an S-NSSAI). In the context of roaming, multiple NRFs may be deployed in the different networks, wherein the NRF(s) in the Visited PLMN (known as the vNRF) are configured with information for the visited PLMN, and wherein the NRF(s) in the Home PLMN (known as the hNRF) are configured with information for the home PLMN, referenced by the vNRF via an N27 interface.

The PCF 708 supports a unified policy framework to govern network behavior. The PCF 708 provides policy rules to Control Plane function(s) to enforce them. The PCF 708 accesses subscription information relevant for policy decisions in a Unified Data Repository (UDR). The PCF 708 may access the UDR located in the same PLMN as the PCF.

The UDM 710 supports generation of 3GPP AKA Authentication Credentials, User Identification Handling (e.g., storage and management of SUPI for each subscriber in the 5G system), de-concealment of a privacy-protected subscription identifier (SUCI), access authorization based on subscription data (e.g., roaming restrictions), UE's Serving NF Registration Management (e.g., storing serving AMF for UE, storing serving SMF for UE's PDU Session), service/session continuity (e.g., by keeping SMF/DNN assignment of ongoing sessions, MT-SMS delivery, Lawful Intercept Functionality (especially in outbound roaming cases where a UDM is the only point of contact for LI), subscription management, SMS management, 5GLAN group management handling, and/or external parameter provisioning (Expected UE Behavior parameters or Network Configuration parameters). To provide such functionality, the UDM 710 uses subscription data (including authentication data) that may be stored in a UDR, in which case a UDM implements the application logic and may not require an internal user data storage and several different UDMs may serve the same user in different transactions. The UDM 710 may be located in the HPLMN of the subscribers it serves, and may access the information of the UDR located in the same PLMN.

The AF 728 interacts with the Core Network to provide services that, for example, support the following: application influence on traffic routing; accessing the NEF 704; interacting with the Policy framework for policy control; and/or IMS interactions with 5GC. Based on operator deployment, Application Functions considered to be trusted by the operator can be allowed to interact directly with relevant Network Functions. Application Functions not allowed by the operator to directly access the Network Functions may use the external exposure framework via the NEF 704 to interact with relevant Network Functions.

The AUSF 712 supports authentication for 3GPP access and untrusted non-3GPP access. The AUSF 712 may also provide support for Network Slice-Specific Authentication and Authorization.

The AMF 714 supports termination of RAN CP interface (N2), termination of NAS (N1) for NAS ciphering and integrity protection, registration management, connection management, reachability management, Mobility Management, lawful intercept (for AMF events and interface to LI System), transport for SM messages between UE and SMF, transparent proxy for routing SM messages, Access Authentication, Access Authorization, transport for SMS messages between UE and SMSF, SEAF, Location Services management for regulatory services, transport for Location Services messages between UE and LMF as well as between RAN and LMF, EPS Bearer ID allocation for interworking with EPS, UE mobility event notification, Control Plane CIoT 5GS Optimization, User Plane CIoT 5GS Optimization, provisioning of external parameters (Expected UE Behavior parameters or Network Configuration parameters), and/or Network Slice-Specific Authentication and Authorization. Some or all of the AMF functionalities may be supported in a single instance of the AMF 714. Regardless of the number of Network functions, in certain embodiments there is only one NAS interface instance per access network between the UE and the CN, terminated at one of the Network functions that implements at least NAS security and Mobility Management. The AMF 714 may also include policy related functionalities.

In addition to the functionalities described above, the AMF 714 may include the following functionality to support non-3GPP access networks: support of N2 interface with N3IWF/TNGF, over which some information (e.g., 3GPP Cell Identification) and procedures (e.g., Handover related) defined over 3GPP access may not apply, and non-3GPP access specific information may be applied that do not apply to 3GPP accesses; support of NAS signaling with a UE over N3IWF/TNGF, wherein some procedures supported by NAS signaling over 3GPP access may be not applicable to untrusted non-3GPP (e.g., Paging) access; support of authentication of UEs connected over N3IWF/TNGF; management of mobility, authentication, and separate security context state(s) of a UE connected via a non-3GPP access or connected via a 3GPP access and a non-3GPP access simultaneously; support a coordinated RM management context valid over a 3GPP access and a Non 3GPP access; and/or support dedicated CM management contexts for the UE for connectivity over non-3GPP access. Not all of the above functionalities may be required to be supported in an instance of a Network Slice.

The SMF 716 supports Session Management (e.g., Session Establishment, modify and release, including tunnel maintain between UPF and AN node), UE IP address allocation & management (including optional Authorization) wherein the UE IP address may be received from a UPF or from an external data network, DHCPv4 (server and client) and DHCPv6 (server and client) functions, functionality to respond to Address Resolution Protocol requests and/or IPv6 Neighbor Solicitation requests based on local cache information for the Ethernet PDUs (e.g., the SMF responds to the ARP and/or the IPv6 Neighbor Solicitation Request by providing the MAC address corresponding to the IP address sent in the request), selection and control of User Plane functions including controlling the UPF to proxy ARP or IPv6 Neighbor Discovery or to forward all ARP/IPv6 Neighbor Solicitation traffic to the SMF for Ethernet PDU Sessions, traffic steering configuration at the UPF to route traffic to proper destinations, 5G VN group management (e.g., maintain the topology of the involved PSA UPFs, establish and release the N19 tunnels between PSA UPFs, configure traffic forwarding at UPF to apply local switching, and/or N6-based forwarding or N19-based forwarding), termination of interfaces towards Policy control functions, lawful intercept (for SM events and interface to LI System), charging data collection and support of charging interfaces, control and coordination of charging data collection at the UPF, termination of SM parts of NAS messages, Downlink Data Notification, Initiator of AN specific SM information sent via AMF over N2 to AN, determination of SSC mode of a session, Control Plane CIoT 5GS Optimization, header compression, acting as I-SMF in deployments where I-SMF can be inserted/removed/relocated, provisioning of external parameters (Expected UE Behavior parameters or Network Configuration parameters), P-CSCF discovery for IMS services, roaming functionality (e.g., handle local enforcement to apply QoS SLAs (VPLMN), charging data collection and charging interface (VPLMN), and/or lawful intercept (in VPLMN for SM events and interface to LI System), interaction with external DN for transport of signaling for PDU Session authentication/authorization by external DN, and/or instructing UPF and NG-RAN to perform redundant transmission on N3/N9 interfaces. Some or all of the SMF functionalities may be supported in a single instance of a SMF. However, in certain embodiments, not all of the functionalities are required to be supported in an instance of a Network Slice. In addition to the functionalities, the SMF 716 may include policy related functionalities.

The SCP 718 includes one or more of the following functionalities: Indirect Communication; Delegated Discovery; message forwarding and routing to destination NF/NF services; communication security (e.g., authorization of the NF Service Consumer to access the NF Service Producer's API), load balancing, monitoring, overload control, etc.; and/or optionally interact with the UDR, to resolve the UDM Group ID/UDR Group ID/AUSF Group ID/PCF Group ID/CHF Group ID/HSS Group ID based on UE identity (e.g., SUPI or IMPI/IMPU). Some or all of the SCP functionalities may be supported in a single instance of an SCP. In certain embodiments, the SCP 718 may be deployed in a distributed manner and/or more than one SCP can be present in the communication path between NF Services. SCPs can be deployed at PLMN level, shared-slice level, and slice-specific level. It may be left to operator deployment to ensure that SCPs can communicate with relevant NRFs.

The UE 720 may include a device with radio communication capabilities. For example, the UE 720 may comprise a smartphone (e.g., handheld touchscreen mobile computing devices connectable to one or more cellular networks). The UE 720 may also comprise any mobile or non-mobile computing device, such as Personal Data Assistants (PDAs), pagers, laptop computers, desktop computers, wireless handsets, or any computing device including a wireless communications interface. A UE may also be referred to as a client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE 720 may comprise an IoT UE, which can comprise a network access layer designed for low-power IoT applications utilizing short-lived UE connections. An IoT UE can utilize technologies (e.g., M2M, MTC, or mMTC technology) for exchanging data with an MTC server or device via a PLMN, other UEs using ProSe or D2D communications, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure). The IoT UEs may execute background applications (e.g., keep-alive messages, status updates, etc.) to facilitate the connections of the IoT network.

The UE 720 may be configured to connect or communicatively couple with the (R)AN 722 through a radio interface 730, which may be a physical communication interface or layer configured to operate with cellular communication protocols such as a GSM protocol, a CDMA network protocol, a Push-to-Talk (PTT) protocol, a PTT over Cellular (POC) protocol, a UMTS protocol, a 3GPP LTE protocol, a 5G protocol, a NR protocol, and the like. For example, the UE 720 and the (R)AN 722 may use a Uu interface (e.g., an LTE-Uu interface) to exchange control plane data via a protocol stack comprising a PHY layer, a MAC layer, an RLC layer, a PDCP layer, and an RRC layer. A DL transmission may be from the (R)AN 722 to the UE 720 and a UL transmission may be from the UE 720 to the (R)AN 722. The UE 720 may further use a sidelink to communicate directly with another UE (not shown) for D2D, P2P, and/or ProSe communication. For example, a ProSe interface may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The (R)AN 722 can include one or more access nodes, which may be referred to as base stations (BSs), NodeBs, evolved NodeBs (eNBs), next Generation NodeBs (gNB), RAN nodes, controllers, transmission reception points (TRPs), and so forth, and can comprise ground stations (e.g., terrestrial access points) or satellite stations providing coverage within a geographic area (e.g., a cell). The (R)AN 722 may include one or more RAN nodes for providing macrocells, picocells, femtocells, or other types of cells. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having an association with the femtocell (e.g., UEs in a Closed Subscriber Group (CSG), UEs for users in the home, etc.).

Although not shown, multiple RAN nodes (such as the (R)AN 722) may be used, wherein an Xn interface is defined between two or more nodes. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for the UE 720 in a connected mode (e.g., CM-CONNECTED) including functionality to manage the UE mobility for connected mode between one or more (R)AN nodes. The mobility support may include context transfer from an old (source) serving (R)AN node to new (target) serving (R)AN node; and control of user plane tunnels between old (source) serving (R)AN node to new (target) serving (R)AN node.

The UPF 724 may act as an anchor point for intra-RAT and inter-RAT mobility, an external PDU session point of interconnect to the DN 726, and a branching point to support multi-homed PDU session. The UPF 724 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. The UPF 724 may include an uplink classifier to support routing traffic flows to a data network. The DN 726 may represent various network operator services, Internet access, or third party services. The DN 726 may include, for example, an application server.

Figure 8:
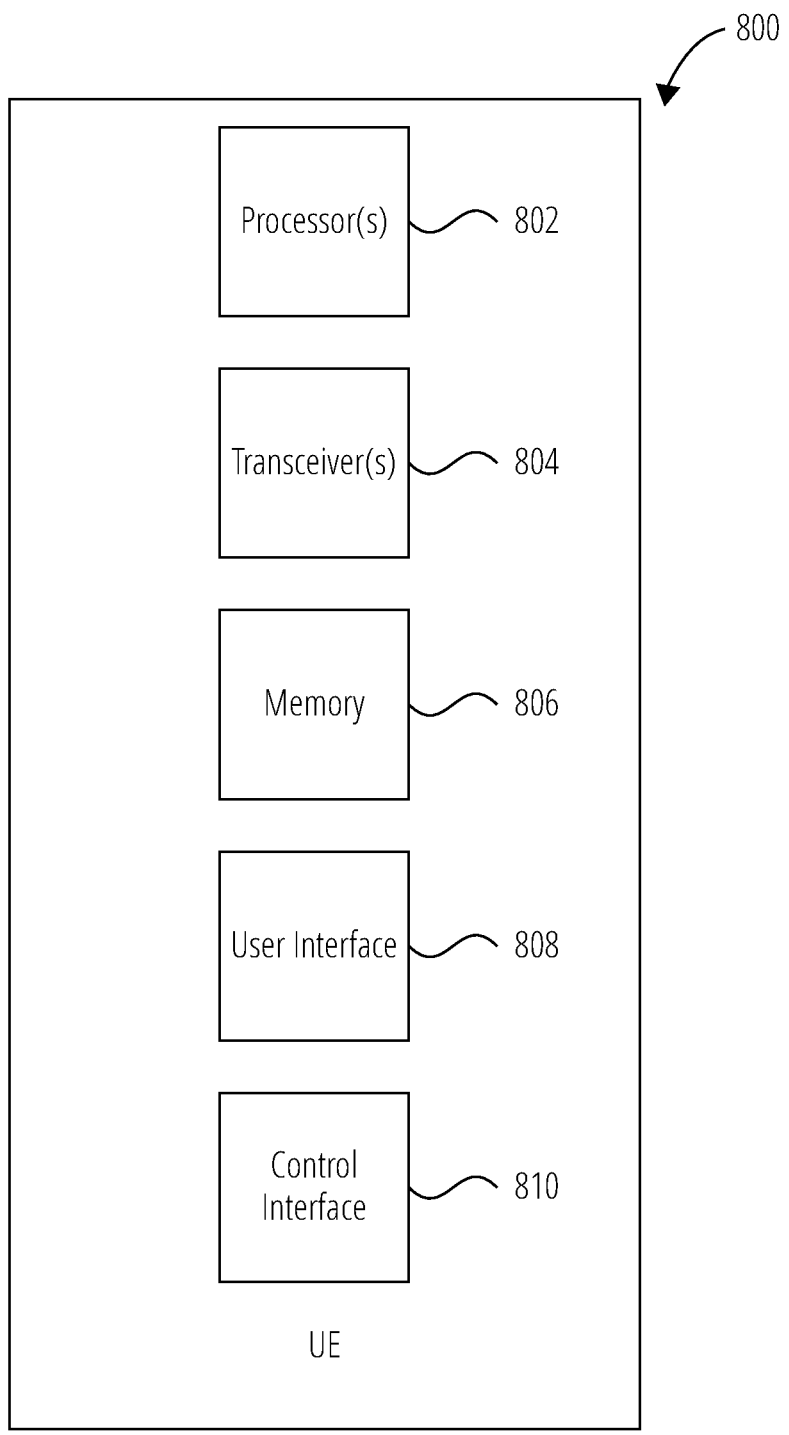
FIG. 8 illustrates a UE in accordance with one embodiment.

FIG. 8 is a block diagram of an example UE 800 configurable according to various embodiments of the present disclosure, including by execution of instructions on a computer-readable medium that correspond to any of the example methods and/or procedures described herein. The UE 800 comprises one or more processor 802, transceiver 804, memory 806, user interface 808, and control interface 810.

The one or more processor 802 may include, for example, an application processor, an audio digital signal processor, a central processing unit, and/or one or more baseband processors. Each of the one or more processor 802 may include internal memory and/or may include interface(s) to communication with external memory (including the memory 806). The internal or external memory can store software code, programs, and/or instructions for execution by the one or more processor 802 to configure and/or facilitate the UE 800 to perform various operations, including operations described herein. For example, execution of the instructions can configure the UE 800 to communicate using one or more wired or wireless communication protocols, including one or more wireless communication protocols standardized by 3GPP such as those commonly known as 5G/NR, LTE, LTE-A, UMTS, HSPA, GSM, GPRS, EDGE, etc., or any other current or future protocols that can be utilized in conjunction with the one or more transceiver 804, user interface 808, and/or control interface 810. As another example, the one or more processor 802 may execute program code stored in the memory 806 or other memory that corresponds to MAC, RLC, PDCP, and RRC layer protocols standardized by 3GPP (e.g., for NR and/or LTE). As a further example, the processor 802 may execute program code stored in the memory 806 or other memory that, together with the one or more transceiver 804, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

The memory 806 may comprise memory area for the one or more processor 802 to store variables used in protocols, configuration, control, and other functions of the UE 800, including operations corresponding to, or comprising, any of the example methods and/or procedures described herein. Moreover, the memory 806 may comprise non-volatile memory (e.g., flash memory), volatile memory (e.g., static or dynamic RAM), or a combination thereof. Furthermore, the memory 806 may interface with a memory slot by which removable memory cards in one or more formats (e.g., SD Card, Memory Stick, Compact Flash, etc.) can be inserted and removed.

The one or more transceiver 804 may include radio-frequency transmitter and/or receiver circuitry that facilitates the UE 800 to communicate with other equipment supporting like wireless communication standards and/or protocols. For example, the one or more transceiver 804 may include switches, mixer circuitry, amplifier circuitry, filter circuitry, and synthesizer circuitry. Such RF circuitry may include a receive signal path with circuitry to down-convert RF signals received from a front-end module (FEM) and provide baseband signals to a baseband processor of the one or more processor 802. The RF circuitry may also include a transmit signal path which may include circuitry to up-convert baseband signals provided by a baseband processor and provide RF output signals to the FEM for transmission. The FEM may include a receive signal path that may include circuitry configured to operate on RF signals received from one or more antennas, amplify the received signals and provide the amplified versions of the received signals to the RF circuitry for further processing. The FEM may also include a transmit signal path that may include circuitry configured to amplify signals for transmission provided by the RF circuitry for transmission by one or more antennas. In various embodiments, the amplification through the transmit or receive signal paths may be done solely in the RF circuitry, solely in the FEM, or in both the RF circuitry and the FEM circuitry. In some embodiments, the FEM circuitry may include a TX/RX switch to switch between transmit mode and receive mode operation.

In some exemplary embodiments, the one or more transceiver 804 includes a transmitter and a receiver that enable device 1200 to communicate with various 5G/NR networks according to various protocols and/or methods proposed for standardization by 3 GPP and/or other standards bodies. For example, such functionality can operate cooperatively with the one or more processor 802 to implement a PHY layer based on OFDM, OFDMA, and/or SC-FDMA technologies, such as described herein with respect to other figures.

The user interface 808 may take various forms depending on particular embodiments, or can be absent from the UE 800. In some embodiments, the user interface 808 includes a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 800 may comprise a tablet computing device including a larger touchscreen display. In such embodiments, one or more of the mechanical features of the user interface 808 may be replaced by comparable or functionally equivalent virtual user interface features (e.g., virtual keypad, virtual buttons, etc.) implemented using the touchscreen display, as familiar to persons of ordinary skill in the art. In other embodiments, the UE 800 may be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many example embodiments of the UE 800 having a touch screen display are capable of receiving user inputs, such as inputs related to exemplary methods and/or procedures described herein or otherwise known to persons of ordinary skill in the art.

In some exemplary embodiments of the present disclosure, the UE 800 may include an orientation sensor, which can be used in various ways by features and functions of the UE 800. For example, the UE 800 can use outputs of the orientation sensor to determine when a user has changed the physical orientation of the UE 800's touch screen display. An indication signal from the orientation sensor can be available to any application program executing on the UE 800, such that an application program can change the orientation of a screen display (e.g., from portrait to landscape) automatically when the indication signal indicates an approximate 90-degree change in physical orientation of the device. In this manner, the application program can maintain the screen display in a manner that is readable by the user, regardless of the physical orientation of the device. In addition, the output of the orientation sensor can be used in conjunction with various exemplary embodiments of the present disclosure.

The control interface 810 may take various forms depending on particular embodiments. For example, the control interface 810 may include an RS-232 interface, an RS-485 interface, a USB interface, an HDMI interface, a Bluetooth interface, an IEEE ("Firewire") interface, an I$^2$C interface, a PCMCIA interface, or the like. In some exemplary embodiments of the present disclosure, control interface 1260 can comprise an IEEE 802.3 Ethernet interface such as described above. In some embodiments of the present disclosure, the control interface 810 may include analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 800 may include more functionality than is shown in FIG. 8 including, for example, a video and/or still-image camera, microphone, media player and/or recorder, etc. Moreover, the one or more transceiver 804 may include circuitry for communication using additional radio-frequency communication standards including Bluetooth, GPS, and/or others. Moreover, the one or more processor 802 may execute software code stored in the memory 806 to control such additional functionality. For example, directional velocity and/or position estimates output from a GPS receiver can be available to any application program executing on the UE 800, including various exemplary methods and/or computer-readable media according to various exemplary embodiments of the present disclosure.

Figure 9:
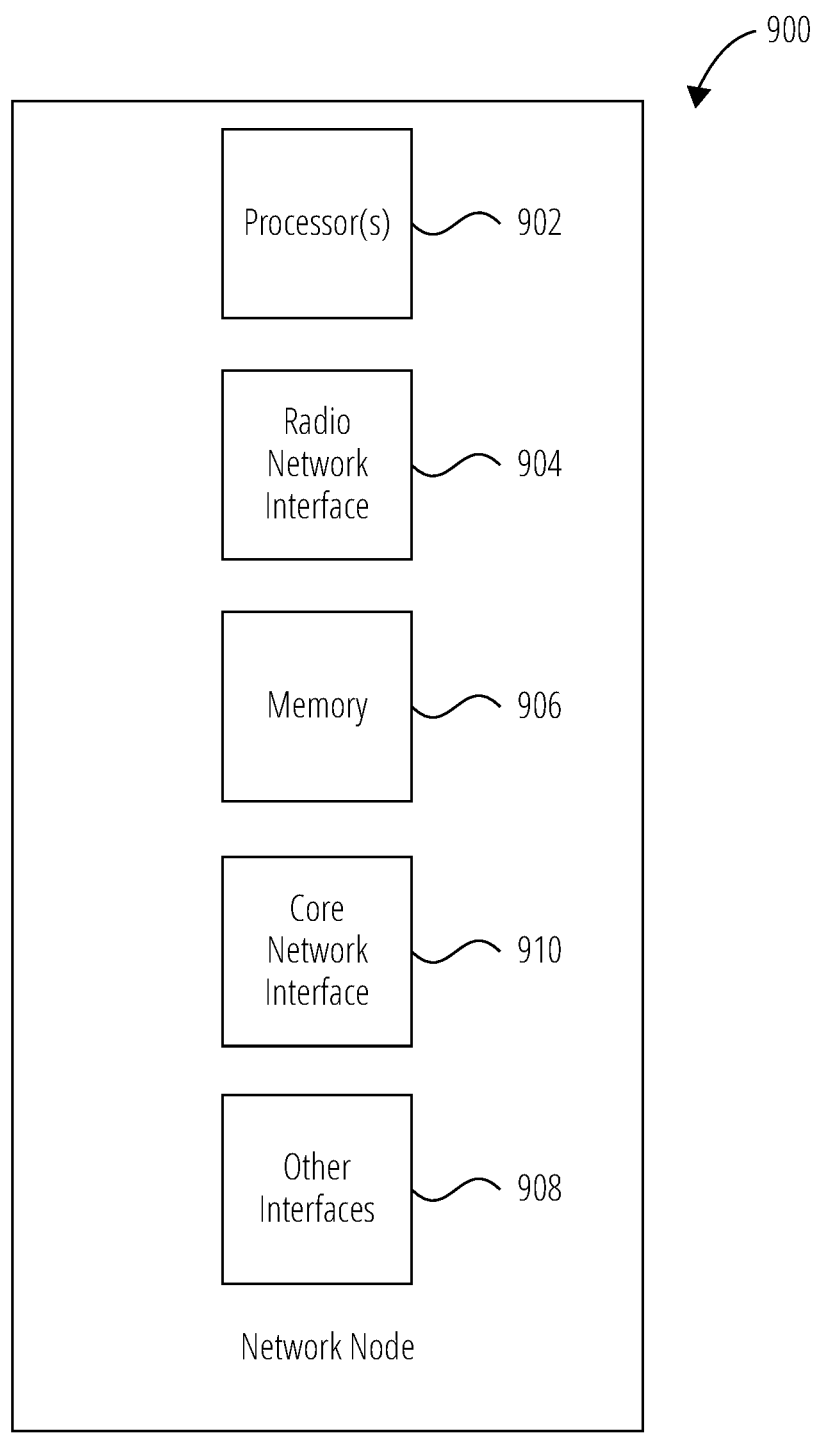
FIG. 9 illustrates a network node in accordance with one embodiment.

FIG. 9 is a block diagram of an example network node 900 configurable according to various embodiments of the present disclosure, including by execution of instructions on a computer-readable medium that correspond to any of the example methods and/or procedures described herein.

The network node 900 includes a one or more processor 902, a radio network interface 904, a memory 906, a core network interface 910, and other interfaces 908. The network node 900 may comprise, for example, a base station, eNB, gNB, access node, or component thereof.

The one or more processor 902 may include any type of processor or processing circuitry and may be configured to perform an of the methods or procedures disclosed herein. The memory 906 may store software code, programs, and/or instructions executed by the one or more processor 902 to configure the network node 900 to perform various operations, including operations described herein. For example, execution of such stored instructions can configure the network node 900 to communicate with one or more other devices using protocols according to various embodiments of the present disclosure, including one or more methods and/or procedures discussed above. Furthermore, execution of such stored instructions can also configure and/or facilitate the network node 900 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with the radio network interface 904 and the core network interface 910. By way of example and without limitation, the core network interface 910 comprise an Si interface and the radio network interface 904 may comprise a Uu interface, as standardized by 3GPP. The memory 906 may also store variables used in protocols, configuration, control, and other functions of the network node 900. As such, the memory 906 may comprise non-volatile memory (e.g., flash memory, hard disk, etc.), volatile memory (e.g., static or dynamic RAM), network-based (e.g., "cloud") storage, or a combination thereof.

The radio network interface 904 may include transmitters, receivers, signal processors, ASICs, antennas, beamforming units, and other circuitry that enables network node 900 to communicate with other equipment such as, in some embodiments, a plurality of compatible user equipment (UE). In some embodiments, the network node 900 may include various protocols or protocol layers, such as the PHY, MAC, RLC, PDCP, and RRC layer protocols standardized by 3GPP for LTE, LTE-A, and/or 5G/NR. According to further embodiments of the present disclosure, the radio network interface 904 may include a PHY layer based on OFDM, OFDMA, and/or SC-FDMA technologies. In some embodiments, the functionality of such a PHY layer can be provided cooperatively by the radio network interface 904 and the one or more processor 902.

The core network interface 910 may include transmitters, receivers, and other circuitry that enables the network node 900 to communicate with other equipment in a core network such as, in some embodiments, circuit-switched (CS) and/or packet-switched Core (PS) networks. In some embodiments, the core network interface 910 may include the Si interface standardized by 3GPP. In some embodiments, the core network interface 910 may include one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of the core network interface 910 may include one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

The other interfaces 908 may include transmitters, receivers, and other circuitry that enables the network node 900 to communicate with external networks, computers, databases, and the like for purposes of operations, administration, and maintenance of the network node 900 or other network equipment operably connected thereto.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network node, etc. as described above in connection with one or more of the preceding figures may be configured to operate in accordance with one or more of the examples set forth below in the example section.

Example Section

The following examples pertain to further embodiments.

Example 1 may include an apparatus comprising means to perform one or more elements of a method described in or related to any of the methods or processes described herein.

Example 2 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 3 may include an apparatus comprising logic, modules, or circuitry to perform one or more elements of a method described in or related to any of the above Examples, or any other method or process described herein.

Example 4 may include a method, technique, or process as described in or related to any of the above Examples, or portions or parts thereof.

Example 5 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 6 may include a signal as described in or related to any of the above Examples, or portions or parts thereof.

Example 7 may include a datagram, packet, frame, segment, protocol data unit (PDU), or message as described in or related to any of the above Examples, or portions or parts thereof, or otherwise described in the present disclosure.

Example 8 may include a signal encoded with data as described in or related to any of the above Examples, or portions or parts thereof, or otherwise described in the present disclosure.

Example 9 may include a signal encoded with a datagram, packet, frame, segment, PDU, or message as described in or related to any of the above Examples, or portions or parts thereof, or otherwise described in the present disclosure.

Example 10 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 11 may include a computer program comprising instructions, wherein execution of the program by a processing element is to cause the processing element to carry out the method, techniques, or process as described in or related to any of the above Examples, or portions thereof.

Example 12 may include a signal in a wireless network as shown and described herein.

Example 13 may include a method of communicating in a wireless network as shown and described herein.

Example 14 may include a system for providing wireless communication as shown and described herein.

Example 15 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

What is claimed is:

1. An apparatus for a user equipment (UE), comprising:
   a memory interface to access executable instructions to access a radio resource control (RRC) operational state for the UE;
   a baseband processing unit coupled to the memory interface, the baseband processing unit to:
   transition the UE to an RRC inactive state from an RRC connected state;
   determine, while the UE is in the RRC inactive state, an RRC operating state mismatch condition between the UE and a network node, wherein to determine the RRC operating state mismatch condition, the baseband processing unit is to determine a drop in serving cell power levels or neighbor cell power levels below a threshold level; and
   initiate, based on the RRC operating state mismatch condition, a state correction procedure;
   wherein the state correction procedure comprises attempting to move from an original cell to camp on a cell that belongs to a different radio access network (RAN) notification area (RNA) than the original cell, and
   wherein if there is no other cell in a different RNA, the baseband processing unit is to:
   establish a new RRC connection to transmit data,
   wherein if the network node rejects the new RRC connection then the baseband processing unit is to initiate a new non-access stratum (NAS) registration procedure, and
   wherein if the network node accepts the new RRC connection then the baseband processing unit is to transition the UE to the RRC inactive state after a period of inactivity.

2. The UE of claim 1, wherein to determine the RRC operating state mismatch condition, the baseband processing unit is to monitor at least one of paging messages, serving cell power levels, or neighbor cell power levels.

3. The UE of claim 2, wherein operations of the state correction procedure are based on the paging messages, the serving cell power levels, and the neighbor cell power levels.

4. The UE of claim 1, wherein to determine the RRC operating state mismatch condition, the baseband processing unit is to detect that a received paging message is not related to Inactive Radio Network Temporary Identifier (I-RNTI), and
   wherein the state correction procedure comprises an RRC connection establishment procedure.

5. The UE of claim 1, wherein to determine the RRC operating state mismatch condition, the baseband processing unit is to determine that the network node is paging the UE in a Discontinuous Reception (DRX) cycle corresponding to an idle mode DRX rather than an inactive state DRX.

6. A method for a user equipment (UE), the method comprising:
    establishing a radio resource control (RRC) connection between the UE and a network node;
    transitioning the UE to an RRC inactive state from an RRC connected state;
    determining, while the UE is in the RRC inactive state, an RRC operating state mismatch condition between the UE and the network node, wherein determining the RRC operating state mismatch condition comprises determining a drop in serving cell power levels or neighbor cell power levels below a threshold level; and
    initiating, based on the RRC operating state mismatch condition, a state correction procedure, wherein the state correction procedure comprises attempting to move from an original cell to camp on a cell that belongs to a different radio access network (RAN) notification area (RNA)than the original cell
    establishing, if there is no other cell in a different RNA, a new RRC connection to transmit data,
    wherein if the network node rejects the new RRC connection then initiating a new NAS registration procedure, and
    wherein if the network node accepts the new RRC connection transitioning the UE to the RRC inactive state after a period of inactivity.

7. The method of claim 6, wherein determining the RRC operating state mismatch condition comprises monitoring at least one of paging messages, serving cell power levels, or neighbor cell power levels.

8. The method of claim 7, wherein operations of the state correction procedure are based on the paging messages, the serving cell power levels, and the neighbor cell power levels.

9. The method of claim 6, wherein determining the RRC operating state mismatch condition comprises detecting that a received paging message is not related to Inactive Radio Network Temporary Identifier (I-RNTI), and
    wherein the state correction procedure comprises an RRC connection establishment procedure.

10. The method of claim 6, wherein determining the RRC operating state mismatch condition comprises determining that the network node is paging the UE in a Discontinuous Reception (DRX) cycle corresponding to an idle mode DRX rather than an inactive state DRX.

11. A non-transitory computer-readable storage medium, the computer-readable storage medium including instructions that when executed by a user equipment (UE), cause the UE to:
    establish a radio resource control (RRC) connection between a UE and a network node;
    transitioning the UE to an RRC inactive state from an RRC connected state;
    determine, while the UE is in the RRC inactive state, an RRC operating state mismatch condition between the UE and the network node; and
    initiate, based on the RRC operating state mismatch condition, a state correction procedure, wherein determining the RRC operate state mismatch condition comprises determining a drop in serving cell power levels or neighbor cell power levels below a threshold level, wherein the state correction procedure comprises to attempt to move from an original cell to camp on a cell that belongs to a different radio access network (RAN) notification area (RNA)than the original cell, and wherein the instructions further configure the UE to:
    establish, if there is no other cell in a different RNA, a new RRC connection to transmit data,
    wherein if the network node rejects the new RRC connection then initiate a new NAS registration procedure, and
    wherein if the network node accepts the new RRC connection transitioning the UE to the RRC inactive state after a period of inactivity.

12. The computer-readable storage medium of claim 11, wherein determining the RRC operate state mismatch condition comprises monitoring at least one of paging messages, serving cell power levels, or neighbor cell power levels.

13. The computer-readable storage medium of claim 12, wherein operations of the state correction procedure are based on the paging messages, the serving cell power levels, and the neighbor cell power levels.

14. The computer-readable storage medium of claim 11, wherein determining the RRC operate state mismatch condition comprises detecting that a received paging message is not related to Inactive Radio Network Temporary Identifier (I-RNTI), and
    wherein the state correction procedure comprises an RRC connection establishment procedure.

15. The computer-readable storage medium of claim 11, wherein determining the RRC operate state mismatch condition comprises determining that the network node is paging the UE in a Discontinuous Reception (DRX) cycle corresponding to an idle mode DRX rather than an inactive state DRX.

* * * * *